US012431078B2

(12) United States Patent
Choi et al.

(10) Patent No.: US 12,431,078 B2
(45) Date of Patent: Sep. 30, 2025

(54) ADAPTIVE BURN-IN COMPENSATION FOR ORGANIC LIGHT-EMITTING DIODE DISPLAYS

(71) Applicant: DELL PRODUCTS L.P., Round Rock, TX (US)

(72) Inventors: Seungjoo Choi, Singapore (SG); Kyoungjun Kim, Singapore (SG); Daehyun Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/425,357

(22) Filed: Jan. 29, 2024

(65) Prior Publication Data

US 2025/0246133 A1 Jul. 31, 2025

(51) Int. Cl.
*G09G 3/3208* (2016.01)

(52) U.S. Cl.
CPC ... *G09G 3/3208* (2013.01); *G09G 2300/0842* (2013.01); *G09G 2310/08* (2013.01); *G09G 2320/046* (2013.01)

(58) Field of Classification Search
None
See application file for complete search history.

(56) References Cited

U.S. PATENT DOCUMENTS

| | | | |
|---|---|---|---|
| 10,049,614 B2 | 8/2018 | Peana et al. | |
| 11,106,240 B2 | 8/2021 | Aurongzeb et al. | |
| 11,423,860 B2 | 8/2022 | Iyer et al. | |
| 2016/0125777 A1 | 5/2016 | Knepper et al. | |
| 2017/0124943 A1* | 5/2017 | Peana | G09G 3/3225 |

* cited by examiner

*Primary Examiner* — Stephen T. Reed
(74) *Attorney, Agent, or Firm* — Larson Newman, LLP

(57) ABSTRACT

An information handling system accumulates degradation information associated with organic light-emitting diode (OLED) display, determines a current degradation level of the OLED display based on the degradation information, and compares the current degradation level of the OLED display to a degradation level limit. If the current degradation level is greater than the degradation level limit, then the system triggers a panel refresh.

20 Claims, 4 Drawing Sheets

ADAPTIVE BURN-IN COMPENSATION FOR ORGANIC LIGHT-EMITTING DIODE DISPLAYS

FIELD OF THE DISCLOSURE

The present disclosure generally relates to information handling systems, and more particularly relates to adaptive burn-in compensation for organic light-emitting diode displays.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system accumulates degradation information associated with organic light-emitting diode (OLED) display, determines a current degradation level of the OLED display based on the degradation information, and compares the current degradation level of the OLED display to a degradation level limit. If the current degradation level is greater than the degradation level limit, then the system triggers a panel refresh.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
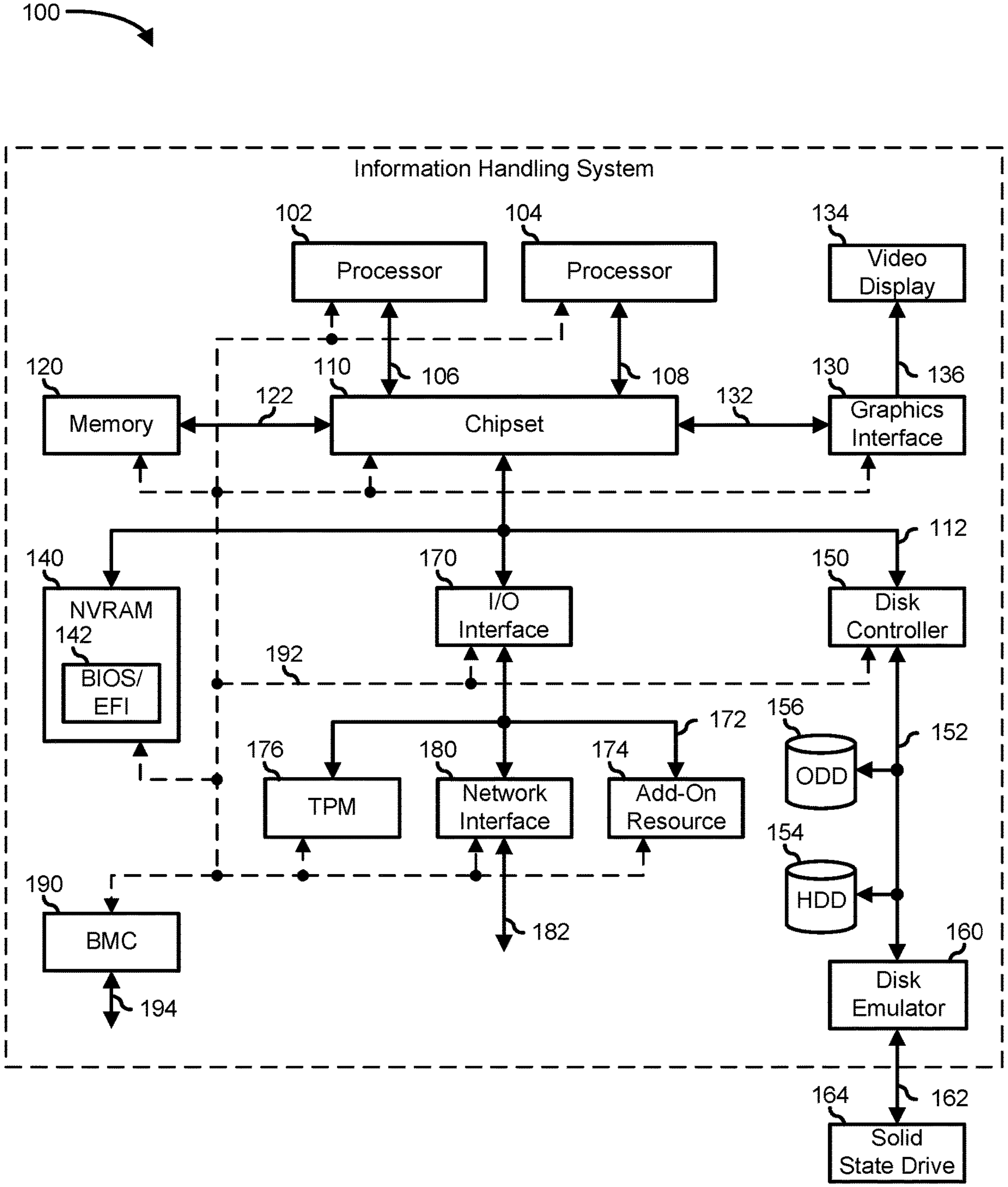
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (0). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit ($I^2C$) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Some information handling systems use organic light-emitting diode (OLED) display devices for displaying information. OLED display devices, sometimes knows simply as OLED displays, are typically desirable due to their wider color gamut and thinner or lighter structure as compared to other display technologies. However, OLED displays suffer from certain issues. For example because OLED displays utilize organic materials that emit light in response to an applied current and/or voltage, OLEDs degrade over time as they are used, which may result in a reduction of image quality. In certain instances, OLED displays may be affected by screen burn-in that results from prolonged display of static content such as a channel logo.

Manufacturers of OLED displays typically provide instructions to prevent burn-in. For example, a manufacturer may perform an automated panel refresh when an accumulated usage time exceeds a factory default setting. The factory default may be set where a long-term image retention is estimated to occur, such as at fifteen hundred hours. However, using the factory default setting to determine whether to perform a panel refresh generally does not consider different user cases and their effect on image retention. For example image retention may occur before the default factory setting if the display device is used in a harsh environment, such as when its brightness setting is constantly set to high. For a relatively less harsh environment, the display refresh may not be needed when the factory default setting is reached. To address these and other concerns, the present disclosure provides a system and method for adaptive burn-in compensation for organic light-emitting diode displays based on degradation level of the OLED display instead of using the factory default setting.

Figure 2:
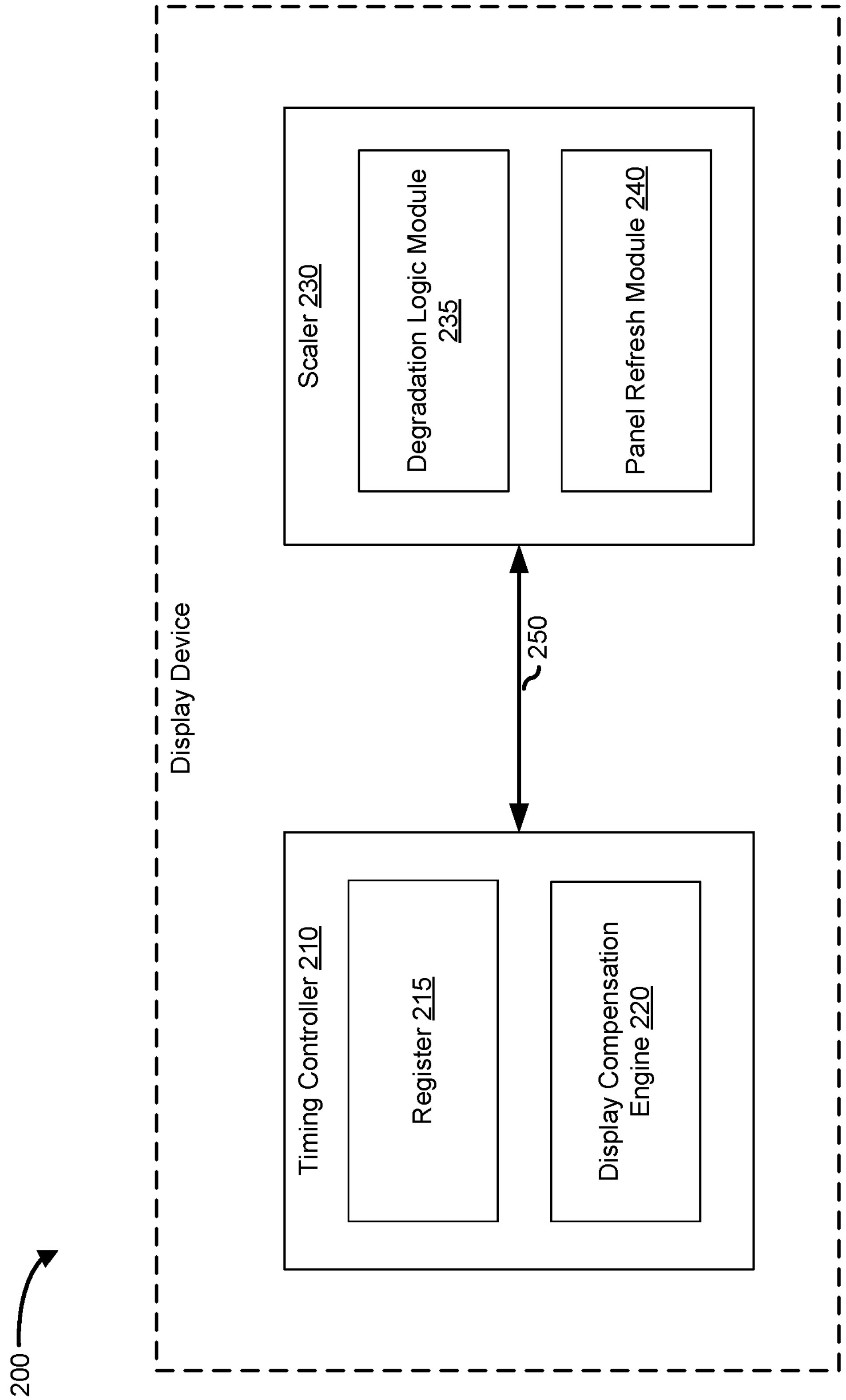
FIG. 2 is a block diagram of a display device configured with adaptive burn-in compensation for organic light-emitting diode displays.

FIG. 2 shows a display device 200 configured with adaptive burn-in compensation for organic light-emitting diode displays. Display device 200, also referred to simply as display 200, includes a timing controller 210 and a scaler 230 which are coupled by an interface 250. Timing controller 210 includes a register 215 and a display compensation engine 220. Scaler 230 includes a degradation logic module 235 and a display panel refresh module 240. The components of display 200 may be implemented in hardware, software, firmware, or any combination thereof. The components shown are not drawn to scale and display 200 may include additional or fewer components. In addition, connections between components may be omitted for descriptive clarity.

Display 200, which is similar to video display 134, may be coupled to an information handling system that is similar to information handling system 100 of FIG. 1. In particular, display 200 may be an OLED, quantum dot OLED (QD-OLED), white OLED (WOLED™), or similar display device. Display 200 may include an OLED screen which may be divided into a plurality of different screen portions or local area units. Degradation of OLEDs in each portion or local area unit may be tracked and stored as degradation information. The degradation information may provide information regarding the state of OLEDs at each local area unit of display 200. For example, the degradation information may include an amount of time each local area unit of display 200 has been powered on. Accordingly, scaler 230 may be configured to track the total number of seconds, minutes, hours, etc. that each local area unit display 200 has been powered on. In addition, the degradation information may also include the amount of time that one or more OLEDs in each local area unit of display 200 have emitted light in response to being powered on. Further, degradation information may include information associated with the state of colors provided by the OLEDs. In addition, the degradation information may include measured brightness degradation levels specific to individual color components of display 200.

Timing controller 210 may be configured to receive and/or collect degradation information associated with display 200 from a video graphics controller and/or OLED panel. The degradation information may be collected and/or received continuously or periodically, such as at a predefined period during the use of display 200. The degradation information may also be collected or received in response to a trigger, such as powering on/off display 200. Timing controller 210 may accumulate the received and/or collected degradation information as part of frame analysis data of pixels in display 200 and stored at register 215, which can be a non-volatile memory.

The degradation information may be used by display compensation engine 220 to compensate for degradation in the OLED display. Display compensation engine 220 may be configured to provide a display compensation function for the degradation of OLEDs in display 200 by determining the change in color that results from their degradation patterns to provide consistent color and/or brightness. For example, display compensation engine 220 may use the degradation information to power the OLEDs in a manner that may cause the OLEDs to emit color and/or brightness that is equivalent to the color and/or brightness that the OLEDs would emit without degradation. For example, display compensation engine 220 may compensate to correct for the color of a pixel which may include a variety of different combinations of color and/or brightness of the red, green, and blue OLEDs. Display compensation engine 220 may utilize current, voltage, power, and/or other OLED driving information that is configured to produce a perceived white color of the pixel using the OLEDs that have been degraded that is equivalent to the white color that would be produced with no degradation in those OLEDs. As such, the perceived display characteristics of display 200 may be kept consistent over time providing a better user experience.

Register 215 may be configured to store and/or load degradation information accumulated in timing controller 210 to scaler 230 via interface 250. Interface 250 can be an $I^2C$ communication channel between timing controller 210 and scaler 230. However, any variety of connections between register 215 and scaler 230 are envisioned as falling within the scope of the present disclosure. The accumulated degradation information stored in register 215 may be used by degradation logic module 235 to track the actual degradation of color and/or brightness of the OLEDs in display 200.

Long-term image retention in OLED displays including QD-OLED displays typically occurs when materials degrade beyond the limits that the display panel can compensate by applying more data voltage to alleviate it. To mitigate or prevent long-term image retention also referred to as burn-in, a panel refresh operation can be performed to adjust the uniformity of the OLED display. Accordingly, panel refresh module 240 may perform the panel refresh operation when triggered by degradation logic module 235.

Degradation logic module 235 may be configured to check the degradation of the OLEDs of display 200 against a predetermined threshold based on the accumulated degradation information. The degradation of OLED material in each pixel can be estimated based on the type of visual images presented by each pixel over time, such as the color and luminance at each pixel. Degradation logic module 235 may determine whether to trigger a display panel refresh based on the check performed. For example, if the degradation of the OLEDs exceeds the threshold, then degradation logic module 235 may trigger panel refresh module 240 to perform a panel refresh. For example, panel refresh module 240 may apply more voltage to alleviate the degradation. The threshold may be predetermined prior to the check performed by degradation logic module 235. Thus, degradation logic module 235 may be configured to guide the panel refresh.

Those of ordinary skill in the art will appreciate that the configuration, hardware, and/or software components of display 200 depicted in FIG. 2 may vary. For example, the illustrative components within display 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
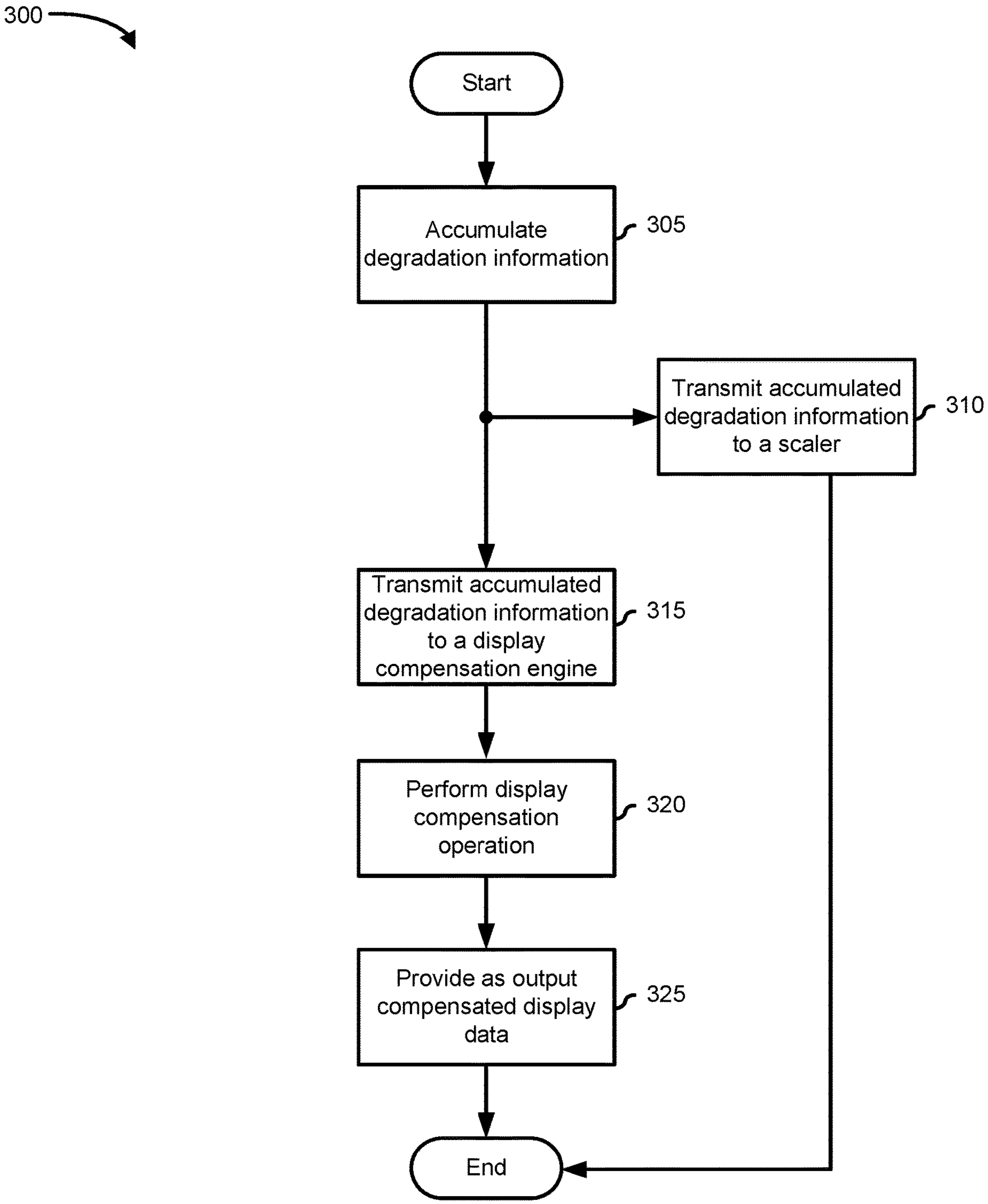
FIGS. 3 and 4 are flowcharts showing methods for adaptive burn-in compensation for organic light-emitting diode displays.

FIG. 3 shows a flowchart of a method 300 for adaptive burn-in compensation for organic light-emitting diode displays. Method 300 may be performed by any suitable component of display 200 including, but not limited to, timing controller 210 of FIG. 2. While embodiments of the present disclosure are described in terms of the components of display 200 of FIG. 2, it should be recognized that other components may be utilized to perform the described method.

Method 300 typically starts at block 305 where timing controller 210 may receive red, green, and blue (RGB) data as display input data, such as from a graphics processing unit (GPU). The input RGB data may include degradation information regarding the OLEDs which timing controller 210 may collect, accumulate, and/or store in a register. In one embodiment, the degradation information includes brightness degradation levels specific to individual color components associated with each local area unit of display 200. After storing the degradation information, timing controller 210 may transmit the accumulated degradation information to scaler 230 or degradation logic module 235 in particular at block 310.

In addition, timing controller 210 may transmit the degradation information to display compensation engine 220 where display compensation engine 220 may compensate for the change in color that results from the degradation of the OLEDs at block 315. The compensation may be performed by powering those OLEDs based on their degradation pattern to provide for consistent color and/or brightness of display 200. For example, display compensation engine 220 may perform an operation associated with an instruction that causes any or all of the OLEDs in display 200 to be powered at a level to compensate for the OLED degradation based on the degradation information. Display compensation engine 220 may also perform an operation based on instructions for compensation OLEDs of a particular color, pixel shifting matrices, circadian times, and/or other display adjustment instructions. At block 325, timing controller 210 may provide as output, compensated display data for display.

Figure 4:
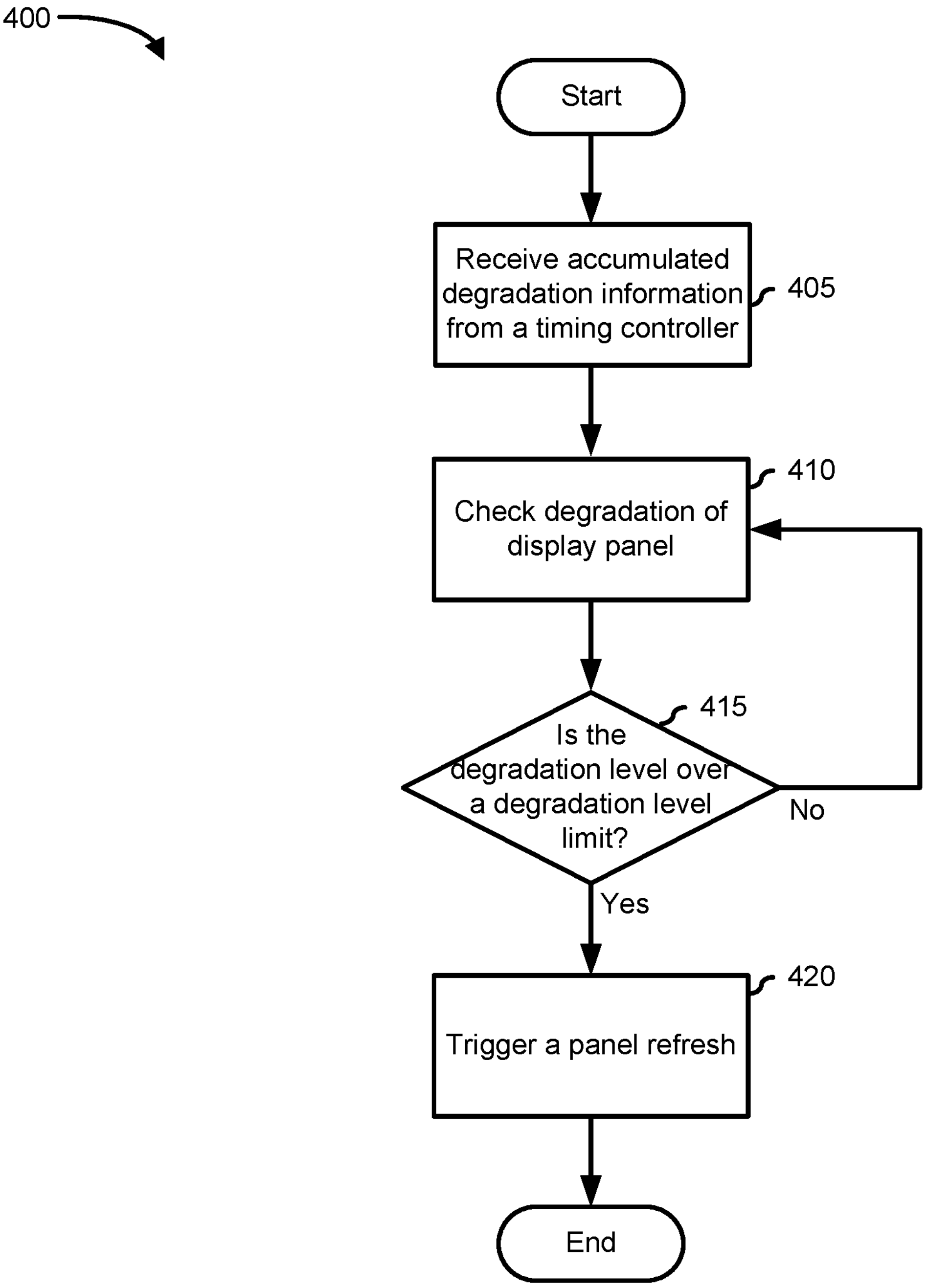

FIG. 4 shows a flowchart of a method 400 for adaptive burn-in compensation for organic light-emitting diode displays. Method 400 may be performed by any suitable component of display 200 of FIG. 2, including, but not limited, to scaler 230. While embodiments of the present disclosure are described in terms of the components of display 200 of FIG. 2, it should be recognized that other components may be utilized to perform the described method.

Method 400 typically starts at block 405 where scaler 230 may receive accumulated degradation information from timing controller 210. The method may proceed to block 410 where degradation logic module 235 may check the level of degradation of the OLED panel. For example, degradation logic module 235 may determine a current degradation level of the OLED panel and compare the current degradation level of the OLED panel to a pre-determined degradation level threshold, which may be specific to a particular type and/or model of display 200. In this example, the pre-determined degradation level threshold may be set by a manufacturer of display 200 or dynamically by dynamic logic module 235 based on the accumulated degradation information. In another example, degradation logic module 235 may compare the current degradation level from one or more expected burn-in degradation models for each of the RGB color components, respectively.

The method proceeds to decision block 415 where degradation logic module 235 may determine whether the current degradation level is over a degradation level limit. If the current degradation level is over the degradation level limit, then the "YES" branch is taken and the method proceeds to block 420, where degradation logic module 235 may trigger refresh module 240 to perform a panel refresh. If the current degradation level is not over the degradation level limit, then the "NO" branch is taken, and the method may loop back to block 410. For example, degradation logic module 235 may determine whether the current degradation level is equal to, or greater than a degradation level threshold.

In this example, the degradation level threshold may be set to a percentage, such as 80%, 75%, or similar. If the degradation level is equal to or greater than the degradation level threshold, then the degradation logic module 235 may trigger panel refresh module 240 to perform a panel refresh. In another example, degradation logic module 235 may compare the current degradation level to one or more expected burn-in degradation models. In this example, if the current degradation level exceeds the expected degradation model based on the models, then degradation logic module 235 may trigger panel refresh module 240 to perform a panel refresh.

Thus, the present disclosure is an improvement in OLED technology by monitoring the degradation level of the display and adaptively guiding the panel refresh based on the current degradation level of the OLEDs instead of waiting for the estimated time that the image retention may occur. Doing so may prevent burn-in and/or statins from occurring due to a compensation error.

Although FIG. 3 and FIG. 4 show example blocks of method 300 and method 400 in some implementations, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and method 400 may be performed in parallel. For example, blocks 310 and 315 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium.

A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

accumulating, by a processor, degradation information associated with organic light-emitting diode (OLED) display;

storing the degradation information in register in a timing controller of the OLED display;

transmitting the degradation information stored in the register to a scaler of the OLED display;

determining, by the scaler, a current degradation level of the OLED display based on the degradation information stored in the register included in the timing controller;

comparing the current degradation level of the OLED display to a degradation level limit; and if the current degradation level is greater than the degradation level limit, then triggering a panel refresh.

2. The method of claim 1, further comprising tracking the degradation information of each local area unit of the OLED display.

3. The method of claim 1, further comprising performing a display compensation operation.

4. The method of claim 1, further comprising providing as output compensated display data.

5. The method of claim 1, further comprising receiving the degradation information.

6. The method of claim 1, wherein the OLED is divided into local area units.

7. The method of claim 6, wherein each of the local area units is associated with particular degradation information.

8. An information handling system, comprising:

a processor; and a memory storing instructions that when executed cause the processor to perform operations including:

accumulating degradation information associated with organic light-emitting diode (OLED) display;

storing the degradation information in a register in a timing controller of the OLED display;

transmitting the degradation information stored in the register to a scaler of the OLED display;

determining, by the scaler, a current degradation level of the OLED display based on the degradation information stored in the scaler;

comparing the current degradation level of the OLED display to a degradation level limit; and if the current degradation level is greater than the degradation level limit, then triggering a panel refresh.

9. The information handling system of claim 8, wherein the operations further comprise tracking the degradation information of each local area unit of the OLED display.

10. The information handling system of claim 8, wherein the operations further comprise performing a display compensation operation.

11. The information handling system of claim 8, wherein the operations further comprise providing as output compensated display data.

12. The information handling system of claim 8, wherein the operations further comprise receiving the degradation information.

13. The information handling system of claim 8, wherein the OLED is divided into local area units.

14. The information handling system of claim 13, wherein each of the local area units is associated with particular degradation information.

15. A non-transitory computer-readable medium to store instructions that are executable to perform operations comprising:

accumulating degradation information associated with organic light-emitting diode (OLED) display;

storing the degradation information in a register in a timing controller of the OLED display;

transmitting the degradation information stored in the register to a scaler of the OLED display;

determining, by the scaler, a current degradation level of the OLED display based on the degradation information stored in the register in the timing controller;

comparing the current degradation level of the OLED display to a degradation level limit; and if the current degradation level is greater than the degradation level limit, then triggering a panel refresh.

16. The non-transitory computer-readable medium of claim 15, wherein the operations further comprise tracking the degradation information of each local area unit of the OLED display.

17. The non-transitory computer-readable medium of claim 15, wherein the operations further comprise performing a display compensation operation.

18. The non-transitory computer-readable medium of claim 15, wherein the operations further comprise providing as output compensated display data.

19. The non-transitory computer-readable medium of claim 15, wherein the operations further comprise receiving the degradation information.

20. The non-transitory computer-readable medium of claim 15, wherein the OLED is divided into local area units.

* * * * *